United States Patent
Bohrer et al.

(10) Patent No.: US 6,925,529 B2
(45) Date of Patent: Aug. 2, 2005

(54) DATA STORAGE ON A MULTI-TIERED DISK SYSTEM

(75) Inventors: Patrick J. Bohrer, Austin, TX (US); Elmootazbellah N. Elnozahy, Austin, TX (US); Charles R. Lefurgy, Round Rock, TX (US); Ramakrishnan Rajamony, Austin, TX (US); Bruce A. Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 09/903,721

(22) Filed: Jul. 12, 2001

(65) Prior Publication Data

US 2004/0243761 A1 Dec. 2, 2004

(51) Int. Cl.⁷ .............................................. G06F 12/00
(52) U.S. Cl. ........................ 711/114; 713/320; 713/324
(58) Field of Search ................................. 711/4, 5, 112, 711/114, 117, 136, 160; 365/227; 713/320, 321, 324

(56) References Cited

U.S. PATENT DOCUMENTS

| | | | | |
|---|---|---|---|---|
| 3,737,881 A | * | 6/1973 | Cordi et al. ................ | 711/116 |
| 4,084,231 A | * | 4/1978 | Capozzi et al. ............. | 711/117 |
| 5,568,629 A | * | 10/1996 | Gentry et al. ............... | 711/114 |
| 5,790,176 A | * | 8/1998 | Craig ......................... | 725/115 |
| 5,809,516 A | * | 9/1998 | Ukai et al. .................. | 711/114 |
| 5,900,007 A | * | 5/1999 | Nunnelley et al. ............ | 711/4 |
| 6,115,536 A | * | 9/2000 | Iwasaki et al. ............. | 386/106 |
| 6,260,127 B1 | * | 7/2001 | Olarig et al. ............... | 711/167 |
| 6,408,400 B2 | * | 6/2002 | Taketa et al. ................. | 714/5 |
| 6,442,698 B2 | * | 8/2002 | Nizar ......................... | 713/320 |
| 6,530,007 B2 | * | 3/2003 | Olarig et al. ............... | 711/167 |

FOREIGN PATENT DOCUMENTS

EP 0416968 A2 * 3/1991

* cited by examiner

*Primary Examiner*—Pierre M. Vital
*Assistant Examiner*—Mardochee Chery
(74) *Attorney, Agent, or Firm*—Cardinal Law Group; Casimer K. Salys

(57) ABSTRACT

A method and a computer usable medium including a program for operating disks having units, comprising: providing a first tier of at least one disk, the first tier storing at least one popular unit, providing a second tier of at least one disk, the second tier storing at least one unpopular unit, powering on at least one first tier disk, powering down the second tier, determining whether a request for a unit requires processing on the first tier or second tier, accessing the requested unit if the requested unit requires processing on the first tier, and powering on a second tier disk to copy the requested unit from the second tier disk to a first tier disk, if the requested unit is stored on the second tier.

11 Claims, 3 Drawing Sheets

DATA STORAGE ON A MULTI-TIERED DISK SYSTEM

TECHNICAL FIELD OF THE INVENTION

The present invention relates to operating computer disks and, more specifically, to a method for allocating files on a multi-tiered computer disk system.

BACKGROUND OF THE INVENTION

Computer systems generally use arrays of disk drives to improve storage performance and reliability. For example, Redundant Arrays of Inexpensive Disks (RAID) have become very popular in server farms. Other configurations are also possible, for instance by spreading a storage volume that logically appears as a single logical disk over several disks. The stored files typically are allocated evenly between several hard disk drives within a computer system, such as in RAID systems, or with no specific distribution as in multi-disk storage volumes.

In dense server systems where power consumption matters, this storage methodology has several shortcomings. For example, RAID systems require all disks to be accessed simultaneously to improve performance and reliability, requiring the entire disk farm to always stay online. This leads to high power consumption. A superior solution would allocate files such that not all disks need to be accessed simultaneously, allowing a part of the disk farm to be turned off to reduce power consumption. For example, laptop computer systems require small hard disks that optimize energy usage. Thus, laptop disks are designed for frequent spin up-and-down cycles and extended off-times. A superior method of allocating files across the array would exploit such disks in server farms or general computing systems and may also utilize power management to effectively reduce power consumption.

Laptop disks are efficient at power management cycles but their file access performance is generally less than optimal. Therefore, the use of laptop disks in a disk array may lead to an increased file access time and reduced performance. A superior method of accessing files from a disk array would ensure fast and reliable file access without sacrificing the power reduction advantages of switching parts of the disk farm off.

In summary, the disk storage architecture of computer systems provides high performance and reliability. The current storage methodology, however, has limitations that may include high power consumption. Therefore, it would be desirable to achieve a strategy for operating an array of computer disks that overcomes the aforementioned and other disadvantages.

SUMMARY OF THE INVENTION

One aspect of the invention provides a method for operating disks having units, comprising: providing a first tier of at least one disk, the first tier storing at least one popular unit, and providing a second tier of at least one disk, the second tier storing at least one unpopular unit. At least one first tier disk is powered on; the second tier is powered down. It is determined whether a request for a unit requires processing on the first tier or second tier. The requested unit is accessed if the requested unit requires processing on the first tier. If the requested unit is stored on the second tier, the second tier disk is powered up. The requested unit is copied from the second tier disk to a first tier disk. The method may further comprise: determining if at least one first tier disk has adequate space to process a requested unit and copying the requested unit from the second tier disk to the first tier disk if at least one first tier disk has adequate space. The requested unit may be created on the first tier. Adequate space may be generated on the first tier. It may be determined if a first tier unit has become unpopular and the unpopular first tier unit may be transferred to a second tier disk. It may be determined if the unpopular first tier unit has been modified and only modified unpopular first tier units may be transferred to the second tier. Providing the first tier may comprise assigning a portion of the disks to the first tier. The first tier disks may comprise high-performance hard drives. The second tier disks may comprise low-power hard drives. The unit may comprise at least one member selected from a group consisting of: a file, a portion of a file, a file system block, a combination of files, and a suitable subdivision of information. The popular unit may comprise a unit meeting or exceeding a condition limit, and the unpopular unit may comprise a unit not meeting the condition limit. The condition limit may be determined based on usage factors.

Another aspect of the invention provides a computer usable medium including: a program for operating a plurality of disks having units of storage allocation, comprising: computer readable program code for providing a first tier of at least one disk, the first tier storing at least one popular unit, computer readable program code for providing a second tier of at least one disk, the second tier storing at least one unpopular unit, computer readable program code for powering on at least one first tier disk, computer readable program code for powering down the second tier, computer readable program code for determining whether a request for a unit is on the first tier or second tier, computer readable program code for accessing a request for a unit if the requested unit requires processing on the first tier, and computer readable program code for powering on a second tier disk, copying the requested unit from the second tier disk to a first tier disk, if the requested unit is stored on the second tier.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
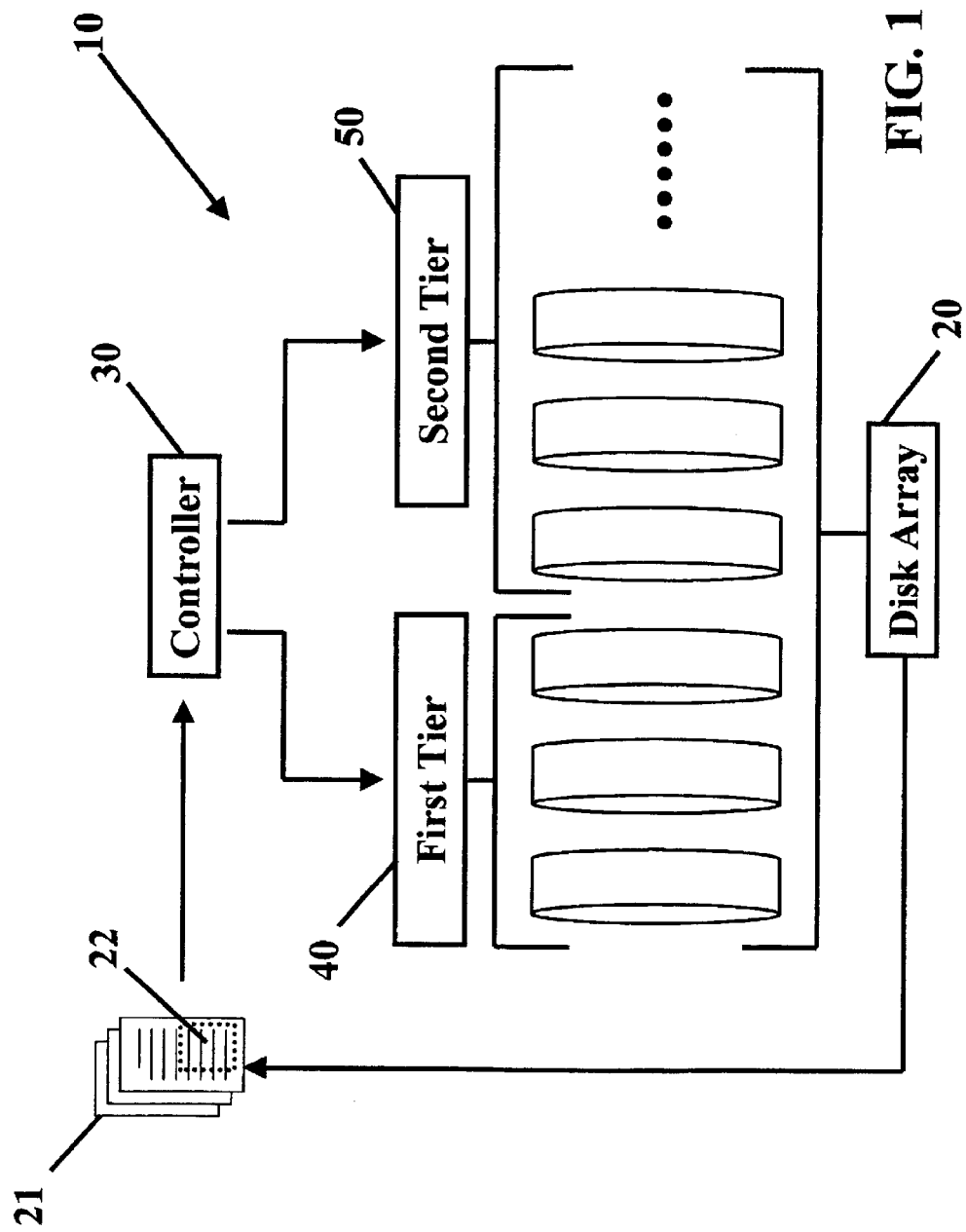
FIG. 1 is a schematic overview of one embodiment of the present invention.

Referring to the drawings, FIG. 1 shows a schematic overview of one embodiment of the present invention designated in the aggregate as numeral 10. In one embodiment, a computer system (not shown) may support an array of disks 20. Those skilled in the art will appreciate that any number of computer hard drive type disks may be suitable for use with the present invention. For example, 3.5-inch form factor type hard drives, 1.8-inch and 2.5-inch form factor laptop type hard drives, and combinations thereof may be functionally adapted for use with the present invention. In one embodiment, the array of disks 20 may include at least one high-performance disk and at least one low-performance disk.

The disks 20 may comprise units of storage allocation. The unit of storage of data allocation in the following description is set to a file. Those skilled in the art will appreciate that the same method can be applied to other units of storage allocation in a straightforward manner (e.g. disk block, file system block, portion of a file, a combination of files, database indexes, etc.). In one embodiment, a plurality of files 21 containing data may be stored on the disks 20. The computer system may be attached to a network wherein the files 21 may be accessed. Furthermore, the files 21 may be modified in number, size, or characteristic through the computer system and other networked computers during a file process. In the following description, a file process or processing of a file may include transferring, accessing, creating, writing, reading, deleting, and modifying a file or its equivalent.

The files 21 may contain file characteristics or attributes 22 such as a file size and an access parameter that are relayed to a controller 30. The file size may reflect the byte count size of the file. The access parameter may reflect any number of statistics relating to file popularity. In one embodiment, the file popularity may be determined by a file access count, a file access rate, a file recent usage rate, or a file access rank. In another embodiment, the file popularity may be determined using the popular least recently used file (LRU) replacement method. Alternatively, the file popularity may be estimated by ranking the access count of the files 21 to determine the file access rank. Files 21 with the greatest access counts may be designated as popular. Files 21 not designated as popular may be designated as unpopular.

The controller 30 may be in the form of a method written in computer readable program code run by the system and/or the disks. The controller 30 may allocate the disks 20 into a plurality of disk tiers. A first tier 40 and a second tier 50, each of at least one disk, may be provided. In one embodiment, providing the first tier may comprise assigning the high-performance disks to the first tier. Providing the second tier may comprise assigning the low-performance, low-power disks to the second tier.

The first tier 40 may store at least one popular file and the second tier 50 may store at least one unpopular file. Popular files may comprise a file meeting or exceeding a condition limit, and unpopular files may comprise a file not meeting the condition limit. The condition limit may be determined based on usage factors. The controller 30 may assimilate the file characteristics information and other policy factors to determine a usage factor for each file. The aforementioned and other functions may be better understood by the following description of controller 30 function.

Figure 2:
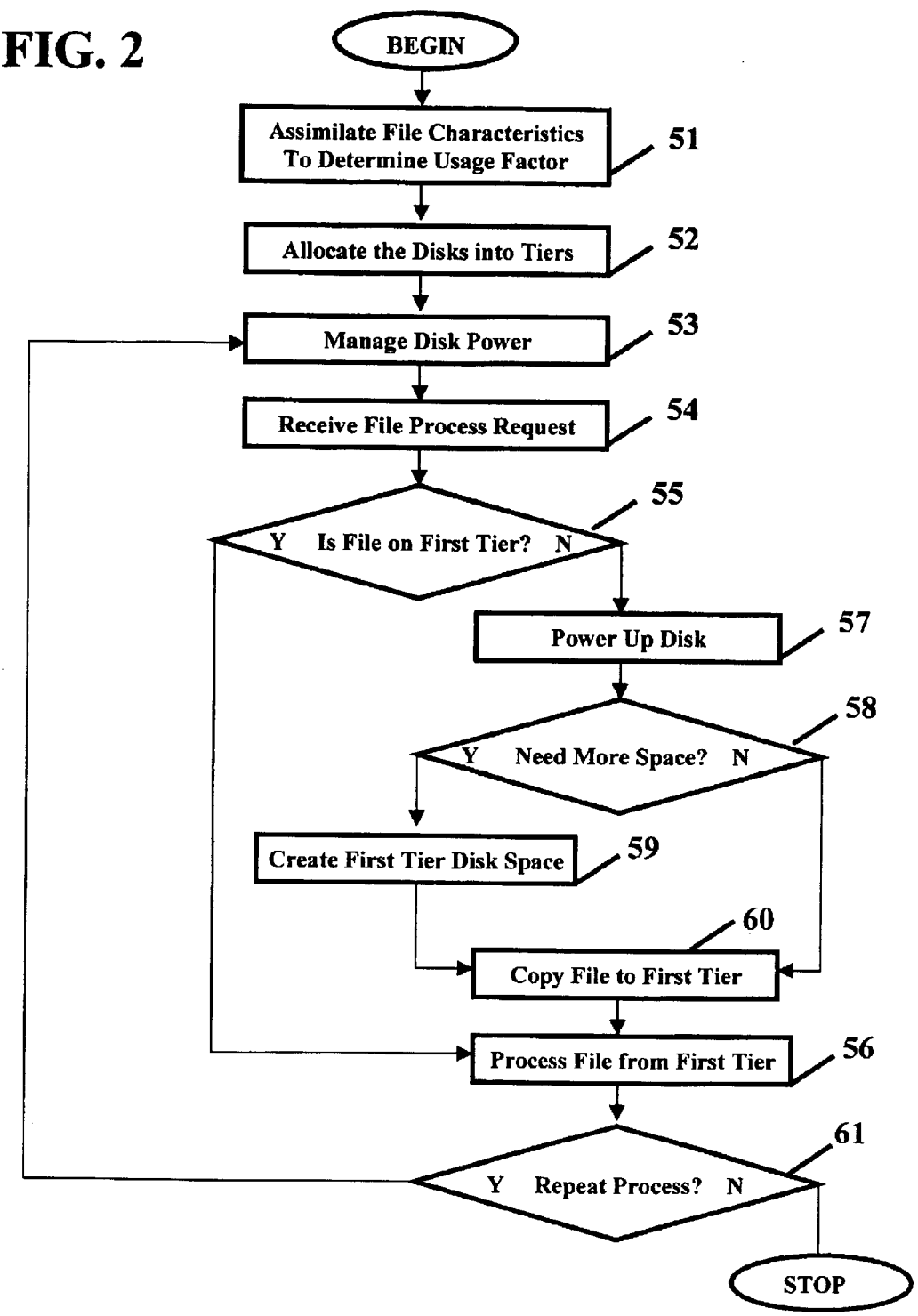
FIG. 2 is a flow diagram of an algorithm according to another embodiment of the present invention.

One embodiment of the invention in which an algorithm for operating a plurality of disks is shown in FIG. 2. The algorithm may be written in computer readable program code and run by the controller 30. In another embodiment, the server and/or the disks may run the algorithm. Those skilled in the art will recognize that a number of strategies exist for operating the disks in a manner consistent with the present invention. The outlined steps of the algorithm may be modified in number, order, or content while maintaining effective operation of the disk array.

As shown in FIG. 2, the aforementioned file characteristic information may be assimilated to determine a usage factor for each file (block 51). The controller may then allocate the array of disks into a plurality of tiers (block 52). In one embodiment, the tiers may comprise a first tier and a second tier. The disk allocation may be based on number of file usage factors meeting or exceeding a condition limit. In one embodiment, the number of disks in the first tier must accommodate the files whose usage factors that meet or exceed the condition limit. For example, those skilled in the art will appreciate that 10 percent of files generally comprise 90 percent of total access operations. The system may be configured such that the 10 percent of files with the highest popularity would be stored on the first tier, while the rest of the files are stored on the second tier. Those skilled in the art will appreciate that these percentages could easily be changed according to the file access patterns and specific configuration parameters such as disk sizes, storage utilization ratio, and file access distributions.

To reduce system power consumption, the controller may then manage disk power of individual disks or entire tiers (block 53). In one embodiment, disk power management may be achieved by controlling spin up/down cycles for the disks. Those skilled in the art will recognize that a variety of hard drive technologies support efficient and reliable on-off duty cycles. Examples include the aforementioned laptop disk drives. The controller may control the disk power of each disk by powering "on" at least one first tier disk and powering "down" the second tier. Typically, the disks designated as the second tier may be powered down until access is required. Power is conserved and overall wear is reduced since only the first tier of disks may be mostly "on" and actively accessed.

The controller may then receive a request to create a file or to process an existing file (block 54). If the request is to create a file, the file may be created on the first tier. If the file already exists, the controller may determine whether the requested file is stored on the first tier or the second tier (block 55). If the requested file is stored on the first tier, the controller may process the file (block 56). Alternatively, if the requested file is stored on the second tier, a second tier disk containing the file may be powered "on" (block 57). The controller may then determine if more space is need on the first tier to allow the second tier file to be transferred (block 58). If additional space is required, the controller may generate additional first tier disk space (block 59). If additional space is not required or after additional space has been generated (block 59), the requested file may be copied to the first tier (block 60). The controller may process the copied first tier file (block 56). The aforementioned method of access is plausible for either read or write accesses. After the requested file has been processed (block 56), the controller may revert back to the aforementioned disk power control step or may terminate the procedure (block 61).

Figure 3:
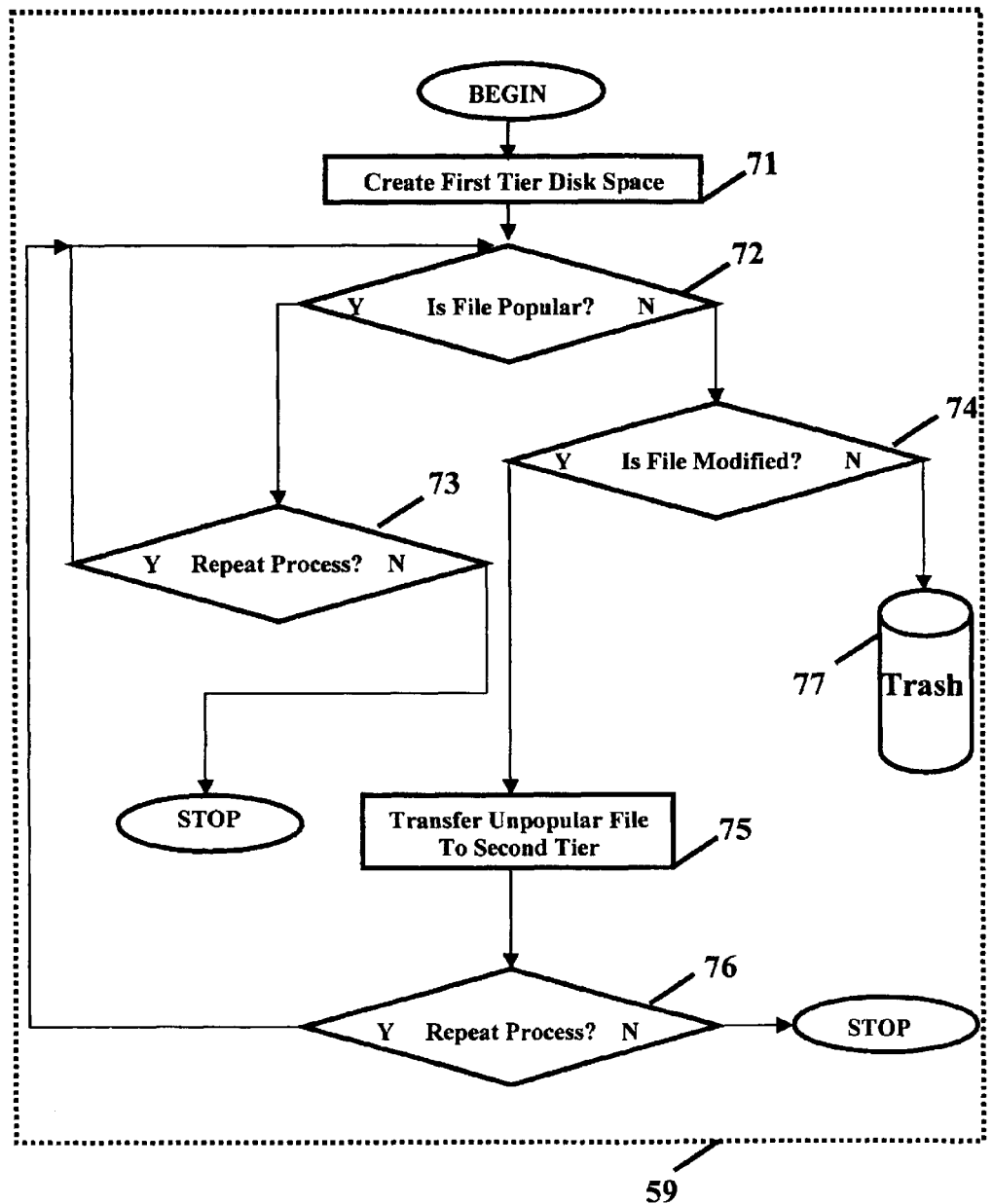
FIG. 3 is a flow diagram of a sub-algorithm of the algorithm shown in FIG. 2.

In one embodiment, as further shown in FIG. 3, the controller may periodically manage the allocation of files between the tiers. This process may be performed during the creation of first tier disk space (block 59) shown in FIG. 2. During this process, the controller may create adequate disk space to allow a file to be copied to the first tier (block 71). The controller may determine if at least one first tier disk has adequate space to receive or create a requested file. If at least one first tier disk has adequate space, the requested file may be transferred to the first tier or created in the first tier. Alternatively, if at least one first tier disk does not have adequate space, the controller may generate adequate space on the first tier.

Generating adequate space on the first tier may comprise determining if a first tier file has become unpopular (block 72). If the file is popular, the controller may examine the popularity of another file on the first tier or may terminate the procedural loop (block 73). If the controller determines that a file located on the first tier is unpopular, the controller may determine if the file has been modified (block 74). If the unpopular file has been modified, the file may be transferred to the second tier (block 75). The controller may then examine the popularity of another file or may terminate the procedural loop (block 76). Alternatively, if the unpopular file has not been modified, the controller may discard said file (block 77). Discarding the file may comprise erasing the file from the disk it is stored. The aforementioned process liberates adequate space on the first tier by ensuring that unpopular files are moved into the second tier. A timer set by an operator of the system or the controller may dictate the aforementioned procedural loop. The timer ensures steady and continuous controller 30 operation as well as operable flexibility. Additionally, the timer information may be utilized for the file access count and rate determinations.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of operating a RAID system, the method comprising:

providing a first tier of at least one disk, the first tier storing at least one popular unit;

providing a second tier of at least one disk, the second tier storing at least one unpopular unit;

powering on at least one first tier disk;

powering down the second tier;

determining whether a request for a unit requires processing on the first tier or second tier;

accessing the requested unit if the requested unit requires processing on the first tier, and powering on a second tier disk to copy the requested unit from the second tier disk to a first tier disk, if the requested unit is stored on the second tier.

2. The method of claim 1 wherein said step of powering on a second tier disk comprises:

determining if at least one first tier disk has adequate space to process a requested unit;

copying the requested unit from the second tier disk to the first tier disk if at least one first tier disk has adequate space; and generating adequate space on the first tier if at least one first tier disk does not have adequate space.

3. The method of claim 2 further comprising:

determining if a first tier unit has become unpopular; and transferring the unpopular first tier unit to a second tier disk.

4. The method of claim 3 further comprising:

determining if the unpopular first tier unit has been modified; and transferring only modified unpopular first tier units to the second tier.

5. The method of claim 1 wherein providing the first tier comprises assigning one or more of the disks to the first tier.

6. The method of claim 1 wherein the first tier disks comprise high-performance hard drives.

7. The method of claim 1 wherein the second tier disks comprise low-power hard drives.

8. The method of claim 1 wherein the unit comprises at least one member selected from a group consisting of: a file, a portion of a file, a file system block, a combination of files, and a suitable subdivision of information.

9. The method of claim 8 wherein the condition limit is determined based on usage factors.

10. The method of claim 1 wherein the popular unit comprises a unit meeting or exceeding a condition limit, and the unpopular unit comprises a unit not meeting the condition limit.

11. A method of providing data storage on a multi-tiered disk system, the method comprising:

providing a RAID system, the RAID system including a first tier of at least one disk, the first tier storing at least one popular unit, and a second tier of at least one disk, the second tier storing at least one unpopular unit;

powering on at least one first tier disk;

powering down the second tier;

determining whether a request for a unit requires processing on the first tier or second tier;

accessing the requested unit if the requested unit requires processing on the first tier; and powering on a second tier disk to copy the requested unit from the second tier disk to a first tier disk, if the requested unit is stored on the second tier.

* * * * *